C. C. CONNER.
Improvement in Cotton-Presses.
No. 129,792.            Patented July 23, 1872.
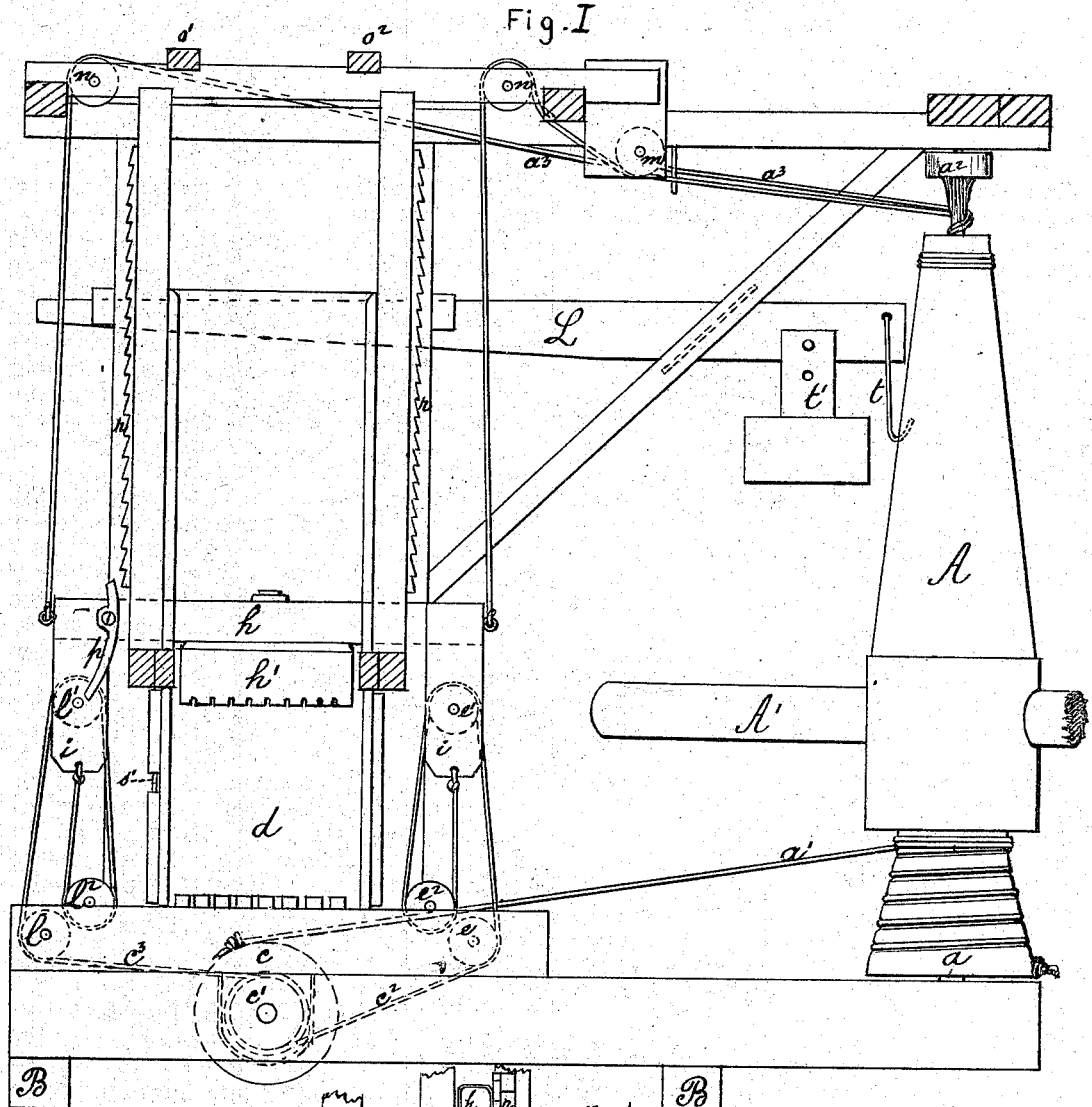
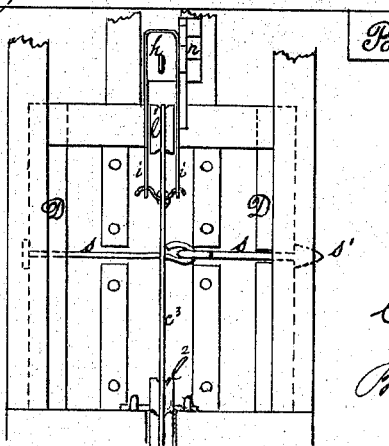
Witnesses:          Inventor:

UNITED STATES PATENT OFFICE.

CHAMP C. CONNER, OF RIPLEY, TENNESSEE.

IMPROVEMENT IN COTTON-PRESSES.

Specification forming part of Letters Patent No. 129,792, dated July 23, 1872.

Specification describing a certain Improvement in a Cotton-Press, invented by CHAMP C. CONNER, D. D., of Ripley, in the county of Lauderdale and State of Tennessee.

This invention relates to the combination, in a cotton-press, of a capstan, a shaft worked by means of a cable wound on the capstan, and a follower, which is drawn down on the bale-box by means of cables attached to the follower-beam and worked by the said shaft, and which is raised in the bale-box by means of a cable attached to the follower-beam and worked by the said capstan; also, to the combination, in a cotton-press, of double-acting pawls with the follower-beam and with ratchets on the outside of the bale-box, which pawls hold the follower when the moving force is intermitted, whether rising or descending; and to an improved apparatus for fastening the side doors of the bale-box.

Figure 1 is a longitudinal vertical section; and Fig. 2 is a partial end view, showing the fastening device.

A is the capstan aforesaid, the same being stepped in one of the end cross-sills of the frame, and having a bearing in the top cross-piece. This capstan has a cone, $a$, with spiral threads at its bottom, around which is wound a cable, $a^1$, that passes around a drum, $c$, secured to a shaft, $c^1$, mounted crosswise of the bed-sills directly beneath the middle of the bale-box $d$. Around the shaft $c$ are wound, in opposite directions, two cables, $c^2$ $c^3$, one of which passes from beneath the shaft and the other from above it to sheaves $e$ $l$, mounted in a slot in the bottom of the bale-box $d$, at opposite sides of the shaft $c^1$. From these sheaves the cables $c^2$ $c^3$ pass upward to and over sheaves $e^1$ $l^1$, mounted in stirrups $i$ depending from the ends of the follower-beam $h$. From the sheaves $e^1$ $l^1$ the cables $c^2$ $c^3$ pass downward to and under sheaves $e^2$ $l^2$, mounted in the same slot of the bale-box bottom as the sheaves $e$ $l$. From the sheaves $e^2$ $l^2$ the cables $c^2$ $c^3$ pass upward to the clevises placed in the lower ends of the stirrups $i$, to which clevises the ends of the cables $c^2$ $c^3$ are fastened; hence, when the capstan A is turned by means of a sliding lever, A′, the follower-beam $h$ and follower $h^1$ are drawn downward by means of the cable $a^1$, turning the shaft $c^1$, which winds in the cables $c^2$ $c^3$. The cable $a^1$ winds upon the cone $a$ from the bottom toward the top, so that the leverage of this cone constantly grows more powerful as the resistance of the bale becomes greater from the beginning to the end of the pressing operation, owing to the constantly-decreasing diameter of the part of the cone which pulls on the cable $a^1$. At the top of the capstan A is another inverted cone, $a^2$, around which are wound, in the opposite direction from the cable $a^1$, two cables, $a^3$, which pass, as shown in the drawing, under sheaves $m$ and over sheaves $n$, mounted in the top of the frame, and pass thence down to the ends of the follower-beam $h$, when they are fastened. Hence, while the cable $a^1$ is winding upon the cone $a$ and drawing down the follower, the cables $a^3$ are unwinding from the cone $a^2$; and, while the cable $a^1$ is unwinding from the cone $a$, the cables $a^3$ are winding upon the cone $a^2$ and drawing up the follower after the bale is pressed. There is also a windlass mounted at the side of the frame for raising the follower, if preferred, by means of ropes working over sheaves at $o^1$ $o^2$ fastened to the top of the follower-beam. To each end of the follower-beam a pawl, $p$, is pivoted, the same having a long and a short arm. Vertical ratchet-bars $r$ are attached to the outside of the bale-box. When the follower is descending the longer arms of the pawls $p$ are placed against these ratchet-bars and their weight serves to keep them in contact with the ratchet-bars, so as to hold the follower at all times against the reaction of the bale. When the follower is rising the shorter arms of the pawl $p$ are turned inward, and the weight of the longer arms serves to keep the shorter arms always in contact with the ratchets, and thus prevents any slipping or falling back of the follower in rising. The side doors D of the bale-box are hung on hinges, which are placed just at the inner corners of the post, so as not to endanger the hinges. Fastened to the swinging end of one of the side doors is a bar, $s$, of iron, jointed at the middle and having a spear-head, $s'$, formed at its swinging end, the shoulders of which head, when both doors are shut, catch in a notch, faced with iron, at the swinging end of the other door, and thus fasten the doors. One blow of a hammer on this spear-head knocks it out of the notch, and the spring of the cotton causes both to fly open. By this arrangement I gain ten inches of space between the outer corner-post and the corners of the bale, which space is of great advantage in sewing the bagging upon the bale. The frame is mounted on axles B, which have rollers at their ends, by means of which the frame is made portable. Placed in brackets at one side of the press is a lever, L, having hooks $t$ at one end and lugs $t'$ pivoted to it, the whole forming a jack small enough for one man to handle with ease, which jack, when the machine is drawn into place, is to be taken out of the brackets and used for hoisting the press high enough to allow the rollers to be removed, so that the machine may be more steady while pressing. After pressing the jack hoists the frame to allow the rollers to be replaced on the axles, and the press to be drawn to the next field.

I claim as my invention—

1. The capstan A having the cone $a$ at its lower end, and the inverted cone $a^2$ at its upper end, in combination with the shaft $c^1$, follower $h^1$, and cables $a^1$ $a^3$ $c$ $c^3$, all arranged and operating as described.

2. The double-acting pawls $p$ having long and short arms, in combination with the follower-beam $h$ and ratchet $r$ on the bale-box, as specified.

3. The doors D, in combination with the jointed bar $s$ provided with the spear-head $s'$, as set forth.

CHAMP C. CONNER.

Witnesses:
L. T. CLARK,
J. A. CAMPBELL.